(12) United States Patent
Hamilton, II et al.

(10) Patent No.: US 8,458,352 B2
(45) Date of Patent: Jun. 4, 2013

(54) CREATING A VIRTUAL UNIVERSE DATA FEED AND DISTRIBUTING THE DATA FEED BEYOND THE VIRTUAL UNIVERSE

(75) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 12/120,625

(22) Filed: May 14, 2008

(65) Prior Publication Data

US 2009/0287758 A1    Nov. 19, 2009

(51) Int. Cl.
G06F 15/16    (2006.01)

(52) U.S. Cl.
USPC .............................. 709/231; 709/23; 709/217

(58) Field of Classification Search
None
See application file for complete search history.

(56) References Cited

U.S. PATENT DOCUMENTS

| | | | |
|---|---|---|---|
| 5,815,586 A | 9/1998 | Dobbins | |
| 6,020,885 A | 2/2000 | Honda | |
| 6,085,256 A | 7/2000 | Kitano et al. | |
| 6,229,533 B1 * | 5/2001 | Farmer et al. | 345/473 |
| 6,281,898 B1 | 8/2001 | Nikolovska et al. | |
| 6,396,509 B1 | 5/2002 | Cheng et al. | |
| 6,452,598 B1 * | 9/2002 | Rafey et al. | 345/473 |
| 6,518,989 B1 | 2/2003 | Ishikawa | |
| 6,704,784 B2 * | 3/2004 | Matsuda et al. | 709/224 |
| 7,036,082 B1 | 4/2006 | Dalrymple et al. | |
| 7,184,038 B2 * | 2/2007 | Sowizral et al. | 345/420 |
| 7,266,616 B1 * | 9/2007 | Munshi et al. | 709/246 |
| 7,801,956 B1 | 9/2010 | Cumberbatch et al. | |
| 2003/0005439 A1 | 1/2003 | Rovira | |
| 2003/0177187 A1 | 9/2003 | Levine et al. | |
| 2003/0187749 A1 * | 10/2003 | Peled et al. | 705/26 |
| 2004/0116183 A1 | 6/2004 | Prindle | |
| 2004/0193441 A1 * | 9/2004 | Altieri | 705/1 |
| 2005/0143174 A1 * | 6/2005 | Goldman et al. | 463/42 |
| 2005/0166163 A1 * | 7/2005 | Chang et al. | 715/863 |

(Continued)

FOREIGN PATENT DOCUMENTS

WO    WO 9509411 A1 *    4/1995

OTHER PUBLICATIONS

Software Garden, "What is RSS?" Jul. 6, 2004, www.rss.softwaregarden.com/aboutrss.html.*

(Continued)

*Primary Examiner* — Patrice Winder
*Assistant Examiner* — Angela Widhalm
(74) *Attorney, Agent, or Firm* — DeLizio Gilliam, PLLC (57) ABSTRACT

Business transactions are becoming more prevalent in virtual universes. Functionality can be implemented within a VU to allow syndication of data feeds to subscribers outside the VU. Feeds collect and serve data from one or more VU objects and locations based on changes made to the VU either by the VU itself, or by avatars in the VU. A location in a virtual universe can be an area defined by at least three coordinates, as an example. Data feeds from a VU can be used to create a VU application with and/or using the data feeds, to derive data from the data feeds, to monitor use of objects or space and billing for such use based on the data feeds, etc.

12 Claims, 6 Drawing Sheets

U.S. PATENT DOCUMENTS

| | | | |
|---|---|---|---|
| 2005/0179685 A1 | 8/2005 | Kake et al. | |
| 2005/0193341 A1 | 9/2005 | Hayward et al. | |
| 2006/0121991 A1 | 6/2006 | Borinik et al. | |
| 2006/0129917 A1* | 6/2006 | Volk et al. | 715/513 |
| 2006/0135261 A1* | 6/2006 | Kinne et al. | 463/42 |
| 2006/0173985 A1* | 8/2006 | Moore | 709/223 |
| 2007/0113181 A1 | 5/2007 | Blattner et al. | |
| 2007/0174467 A1* | 7/2007 | Ballou et al. | 709/227 |
| 2007/0192352 A1 | 8/2007 | Levy | |
| 2007/0192674 A1 | 8/2007 | Bodin et al. | |
| 2007/0209011 A1 | 9/2007 | Padmanabhuni et al. | |
| 2007/0220016 A1 | 9/2007 | Estrada et al. | |
| 2007/0225071 A1* | 9/2007 | Van Luchene et al. | 463/29 |
| 2007/0255807 A1 | 11/2007 | Hayashi et al. | |
| 2007/0265090 A1 | 11/2007 | Barsness et al. | |
| 2007/0265091 A1 | 11/2007 | Aguilar, Jr. et al. | |
| 2008/0059348 A1* | 3/2008 | Glassman et al. | 705/35 |
| 2008/0059570 A1* | 3/2008 | Bill | 709/203 |
| 2008/0090659 A1* | 4/2008 | Aguilar et al. | 463/42 |
| 2008/0194332 A1 | 8/2008 | Kadikario et al. | |
| 2008/0200253 A1 | 8/2008 | Van Luchene et al. | |
| 2008/0207329 A1 | 8/2008 | Wallace et al. | |
| 2008/0248849 A1* | 10/2008 | Lutnick et al. | 463/16 |
| 2008/0270319 A1* | 10/2008 | Torabi et al. | 705/36 R |
| 2008/0284779 A1* | 11/2008 | Gu et al. | 345/419 |
| 2008/0306951 A1* | 12/2008 | Rodefer | 707/9 |
| 2008/0318678 A1 | 12/2008 | Stivoric et al. | |
| 2009/0007186 A1* | 1/2009 | Hartwell | 725/62 |
| 2009/0017913 A1* | 1/2009 | Bell et al. | 463/40 |
| 2009/0024943 A1* | 1/2009 | Adler et al. | 715/764 |
| 2009/0069084 A1* | 3/2009 | Reece et al. | 463/32 |
| 2009/0094287 A1* | 4/2009 | Johnson et al. | 707/104.1 |
| 2009/0100353 A1* | 4/2009 | Cradick et al. | 715/757 |
| 2009/0112970 A1* | 4/2009 | Dawson et al. | 709/202 |
| 2009/0124349 A1* | 5/2009 | Dawson et al. | 463/24 |
| 2009/0132422 A1* | 5/2009 | Booth et al. | 705/52 |
| 2009/0138906 A1* | 5/2009 | Eide et al. | 725/32 |
| 2009/0144267 A1 | 6/2009 | Cook et al. | |
| 2009/0144639 A1* | 6/2009 | Nims et al. | 715/757 |
| 2009/0147003 A1* | 6/2009 | Do et al. | 345/427 |
| 2009/0158161 A1 | 6/2009 | Gibbs et al. | |
| 2009/0164279 A1* | 6/2009 | Black | 705/7 |
| 2009/0172570 A1* | 7/2009 | Arcas et al. | 715/764 |
| 2009/0209335 A1 | 8/2009 | Pearce | |
| 2009/0215433 A1* | 8/2009 | Cavanaugh et al. | 455/414.1 |
| 2009/0241039 A1 | 9/2009 | Estevez et al. | |
| 2009/0241126 A1* | 9/2009 | Beggs et al. | 719/318 |
| 2009/0288001 A1 | 11/2009 | Hamilton, II et al. | |
| 2009/0319892 A1* | 12/2009 | Wright et al. | 715/701 |
| 2010/0005424 A1 | 1/2010 | Sundaresan et al. | |

OTHER PUBLICATIONS

Dudeney, Gavin, "Streaming RSS Feeds in World", https://lists.secondlife.com/pipermail/educators/2006-September/002536.html (Date Obtained from internet Apr. 20, 2010) Sep. 24, 2006, 3 Pages.

"U.S. Appl. No. 12/120,629 Office Action", Dec. 13, 2010, 27 pages.

"U.S. Appl. No. 11/877,875 Final Office Action", Apr. 14, 2011, 15 pages.

"U.S. Appl. No. 11/877,875 Office Action", Oct. 12, 2010, 12 pages.

"U.S. Appl. No. 12/120,629 Final Office Action", Mar. 29, 2011, 33 pages.

"Animal Crossing Wild World: Instruction Booklet for Nintendo DS", Nintendo 2005, 24 pages.

"U.S. Appl. No. 12/120,629 Office Action", Oct. 6, 2011, 32 pages.

* cited by examiner

CREATING A VIRTUAL UNIVERSE DATA FEED AND DISTRIBUTING THE DATA FEED BEYOND THE VIRTUAL UNIVERSE

BACKGROUND

Embodiments of the inventive subject matter generally relate to the field of virtual universe systems, and more particularly, to creating a virtual universe web feed and distributing the web feed beyond the virtual universe.

Virtual universe applications allow people to socialize and interact in a virtual universe. A virtual universe (VU) is a computer-based simulated environment intended for its residents to traverse, inhabit, and interact through the use of avatars. Many VUs are represented using 3-D graphics and landscapes, and are populated by many thousands of users, known as residents. Other terms for VUs include metaverses and "3D Internet."

Users of a virtual universe conduct business and engage in social interactions based on the representation of their avatars and the interaction of the avatars with asset, environment, and other avatar data served from the VU's simulated environment. Virtual economies are emerging as the rate of business and social interactions within VUs is rapidly increasing.

SUMMARY

Embodiments include a method directed to identifying one or more objects in a virtual universe as a data source for a data feed. Data from the data source in the virtual universe is collected into the data feed. The data is distributed to one or more subscribers to the data feed. The subscribers are outside the virtual universe.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to Really Simple Syndication (RSS), embodiments can be implemented with any current or future technology similar to RSS, such as the Atom Syndication Format. In other instances, well-known instruction instances, protocols, structures and techniques have not been shown in detail in order not to obfuscate the description.

Business transactions are becoming more prevalent in virtual universes. Functionality can be implemented within a VU to allow syndication of data feeds to subscribers outside the VU. Feeds collect and serve data from one or more VU objects and locations based on changes made to the VU either by the VU itself, or by avatars in the VU. A location in a virtual universe can be an area defined by at least three coordinates, as an example. Data feeds from a VU can be used to create a VU or non-VU application with and/or using the data feeds, to derive data from the data feeds, to monitor use of objects or space and billing for such use based on the data feeds, etc.

Figure 1:
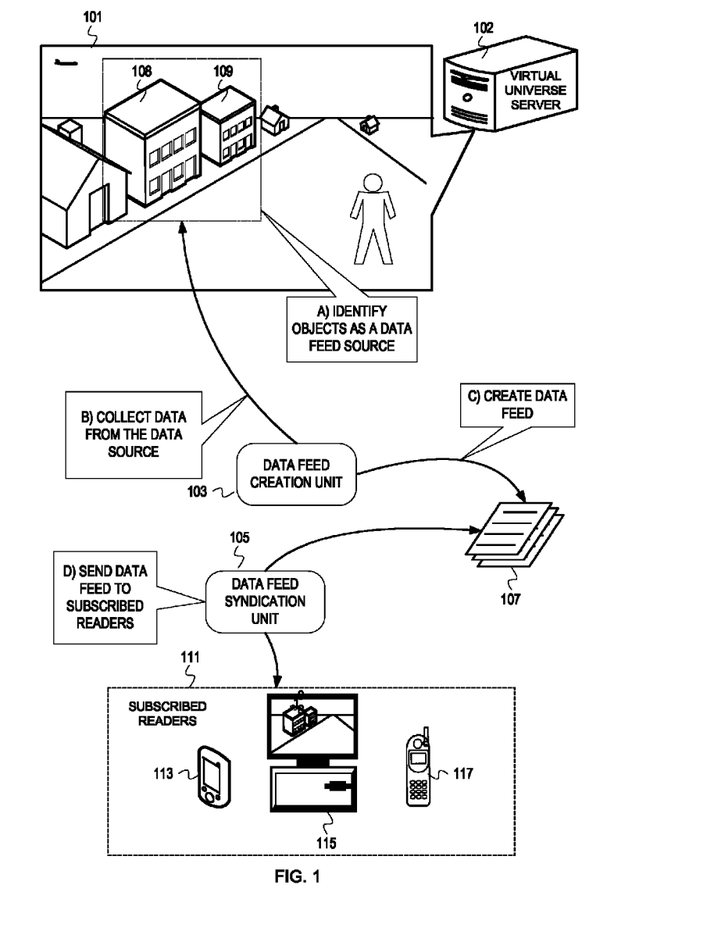
FIG. 1 depicts an example of data feed creation within a virtual universe 101.

FIG. 1 depicts an example of data feed creation within a virtual universe. A perspective 101 of a virtual universe is supported by a virtual universe server 102 and includes various graphical objects (e.g., buildings, avatars, vehicles, etc.) that make up the perspective 101. In FIG. 1, the perspective 101 comprises building graphical objects 108 and 109. In stage A, the building 108 and the building 109 are identified as a source for a data feed ("data feed source"). An object is identified as a data feed source when a user or program selects the object and chooses an option to make the object a data feed source.

At stage B, a data feed creation unit 103, collects data from the data feed source. Examples of collected data are graphical images, effects data, textures, coordinates, metadata, tracked usage, scripts, etc. As an example, data collected from buildings 108 and 109 may be statistical data (e.g., how many avatars passed by in a certain period of time, how many avatars entered one of the buildings, etc.), snapshots of avatars in the building, capture of the entire scene, etc.

At stage C, the data feed creation unit 103 creates a data feed 107 for syndication (e.g., using Really Simple Syndication (RSS)). As an example, the collected data may be formatted for syndication with data types separated into various fields (e.g., date and time formatted into a timestamp field, graphical images or metadata formatted into a description field, etc.).

At stage D, a data feed syndication unit 105 sends the data feed 107 to a set of subscribed readers 111. Although a push type syndication model is described, embodiments can implement a pull type syndication model or a hybrid of push and pull syndication The subscribed readers 111 are applications running on various devices, examples of which include a computer 115, a personal digital assistant (PDA) 113, and a mobile phone 117. A data feed reader running on computer 115 displays the data in the feed 107. The feed 107 may not contain data about all objects shown in the perspective 101. Five buildings are shown in the perspective 101. The buildings 108 and 109 are selected as the data source. The feed 107 contains data pertaining to the buildings 108 and 109, but not the other three buildings.

For example, the buildings 108 and 109 are listed for rent as storefronts by a property management company. The property management company identified the buildings 108 and 109 as a data feed to collect traffic data to show perspective tenants. The RSS feed 107 may include data such as how many avatars passed the buildings 108 and 109, demographics of passersby, images of passersby, etc.

Figure 2:
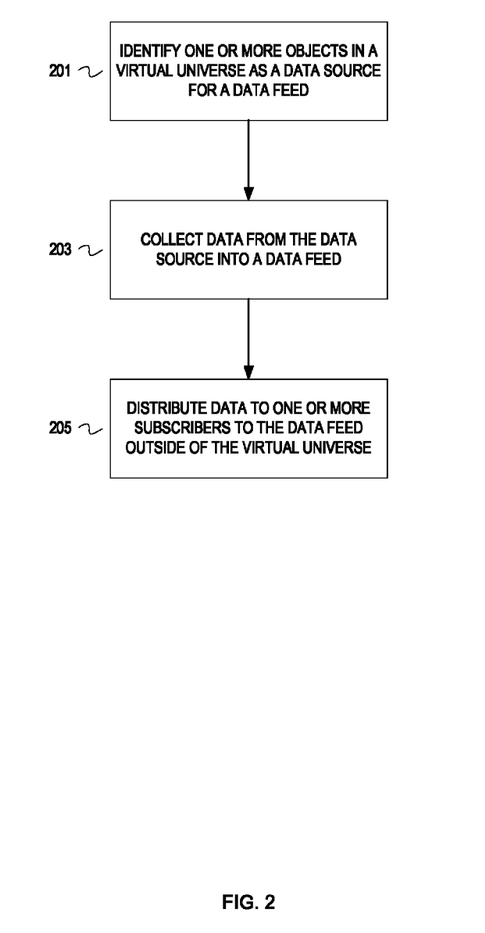
FIG. 2 depicts a flowchart of example operations for distributing a data feed to subscribers outside a VU.

FIG. 2 depicts a flowchart of example operations for distributing a data feed to subscribers outside a VU. Flow begins at block 201, where one or more objects in a VU are identified as a data source for a data feed. Examples of objects that can be used as data sources are buildings, avatars, vehicles, etc.

At block 203, data from the data source is collected into a data feed. An object indicated as a data source may contain one or more additional objects. Data is collected for each additional object contained within the data source object.

Examples of objects that contain one or more additional objects include buildings, store product displays, etc.

At block 205, the data is distributed to one or more data feed subscribers outside of the virtual universe. In some embodiments, the data feed may be distributed at certain time intervals (e.g., daily). In other embodiments, the data feed may be a continuous stream of updates. In some embodiments, the data feed may be distributed to a subset of subscribers. Data feed distribution can be based on one or more conditions being met. For example, the embodiments can distribute a data feed to all subscribers at an interval of 30 minutes, but distribute the data feed containing a continuous stream of updates to a subset of subscribers (e.g., system administrators, authorities, object owners, etc.) when a particular condition is satisfied in the virtual universe.

Figure 3:
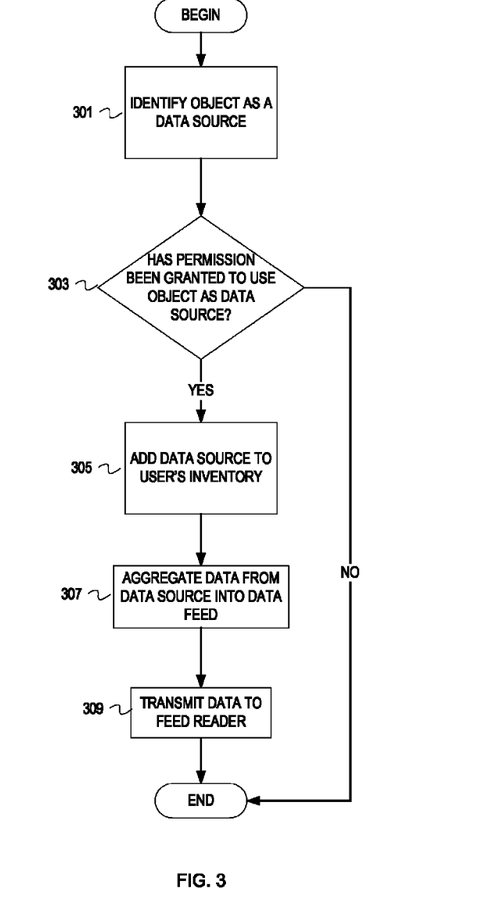
FIG. 3 is a flowchart depicting example operations for creating and transmitting a data feed from a virtual universe.

FIG. 3 is a flowchart depicting example operations for creating and transmitting a data feed from a virtual universe. Flow begins at block 301, where an object is identified as a data source. For example, a user selects an object and chooses an option to make the object a data source. As another example, a program selects an object based on a pattern match, such as a location visited by a threshold or percentage of avatars, an avatar engaging in sales above a threshold number or amount, etc. At block 303, it is determined if permission has been granted to use the object as a data source. In one example, a request for permission to use the object as a data source can be sent to an owner of the object which may include samples of data that may be syndicated. In another example, the owner of the object can set a permission configuration associated with the object. If permission is granted to use the object as a data source, flow continues at block 305. If permission is not granted to use the object as a data source, flow ends.

At block 305, the data source is added to an inventory associated with the user's avatar. The inventory is a set of assets that are available to the user within the virtual universe. The inventory may contain tangible items such as clothing and vehicles and intangible items such as scripts and images. While the data source resides in the user's inventory, the user is considered to be subscribed to a data feed associated with the data source.

At block 307, data from the data source is aggregated into a data feed.

At block 309, the data is transmitted to subscribed feed readers outside the virtual universe and flow ends.

Data feed transmission can occur at certain intervals (i.e., daily). As an example, a user maintains an account in several VUs to work as a marketing consultant for several client companies that run virtual retail outlets in the VUs. In order to avoid logging into several VUs every day, the consultant implements an RSS feed from each of the VU retail centers. The RSS feeds provide periodic scene aggregates to an RSS reader application that allows switching between retail centers for daily site tours of each virtual store. The consultant may also create data feeds that collect statistical data over time, such as number and amount of sales, number of avatars in the store, demographics of avatars in the store, etc. A feed may be created to derive graphical data representing correlations between statistical data and avatar activity over time. For example, a feed can contain plots of avatar traffic flow in the store over a day. The data can be analyzed to determine the most and least popular areas of the store, navigation problems within the store, etc.

Data feed transmission can occur continuously. For example, a company is interested in introducing a certain number of new customers to a VU per day. The company wishes to allow new users to tour the VU, but due to server load cannot instantiate each guest avatar into the VU interface, or due to a lack of user willingness to install the VU client in order to tour the VU. Instead, the company can allow potential users to subscribe to an RSS feed. An RSS scene aggregator application provided by the company can render scenes at specific locations in each region of the VU. The web feed scene aggregator can also provide data sufficient for a limited view of each region. To limit computing resources to display the scene data, a partial representation of the scene data for each region may be collected into the data feed. For example, collected scene data may be limited to a certain number of objects and/or avatars, avatars may be represented by low resolution shapes, objects and/or avatars may be represented by outlines instead of graphics, etc.

In some cases, a user may want to create a data source that transmits a data feed when certain parameters/conditions are met. Functionality can be implemented within a virtual universe to create a data feed when a trigger event occurs. The data feed may include data about the trigger event itself and/or about an avatar that caused the trigger event to occur. Triggered data feeds can be used to derive statistics, monitor use of objects and space and bill for such use, etc. In such cases, the user may be notified, such as via email, of the new data feed, as well as instructions on how to subscribe to it in their RSS reader or other client. Alternatively, users may be given individual feeds wherein additional feeds are distributed as separate categories of the user's feed as opposed to creating a separate feed.

Figure 4:
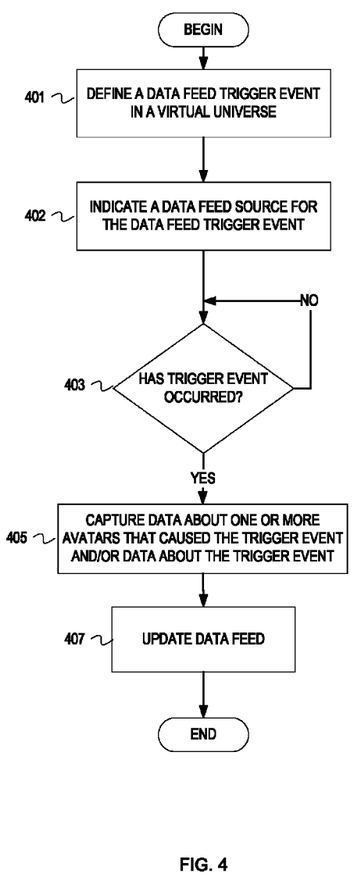
FIG. 4 is a flowchart depicting example operations for creating and distributing a triggered data feed.

FIG. 4 is a flowchart depicting example operations for creating and distributing a triggered data feed. Flow begins at block 401, where a data feed trigger event is defined in a virtual universe. At block 402, a data feed source is indicated for the data feed trigger event. For example, avatars, in general, are indicated as the data feed source for the trigger event. A data feed trigger event is defined by one or more conditions with one or more objects. The trigger event occurs when the one or more conditions have been satisfied. Example conditions include an avatar coming within a threshold distance from an object or location, an avatar picking up an object, an avatar entering a building, an avatar changing an attribute of an object, arrival of a particular time, etc. In addition, embodiments can implement nested dependent conditions. For instance, a trigger event can be defined with a first condition that a current time be within a given range and a second condition that a given number of avatars be within a threshold distance of at least two of five objects identified as a data feed source.

At block 403, it is determined if the trigger event has occurred. If the trigger event has occurred, flow continues at block 405. If the trigger event has not occurred, flow continues at block 403.

At block 405, data about an avatar causing the trigger event and/or data about the trigger event is captured. An example of a trigger event associated with a concert venue is an avatar crossing a boundary that defines the area of the concert venue. The condition is satisfied and the trigger event occurs when the avatar walks through a doorway of the venue. Data captured when the avatar entered the venue may include a time stamp of when the trigger event occurs, a unique identifier of the avatar, etc. Another example of condition is an avatar touching an interactive display in a museum. The condition is satisfied and the trigger event occurs when the avatar touches the display. Data captured may include the amount of time the avatar interacted with the display, the number of times the display was touched throughout the day, etc.

In addition, a trigger event for a data feed may have more than one condition. For example, a store owner may want to analyze the effectiveness of a product display. Conditions can be set up to detect an avatar stopping in front of the display, touching the display, picking up a product from the display, etc.

At block 407, the data feed is updated. Embodiments can accumulate data feed updates and update the data feed at certain intervals in batches, can update the data feed at every occurrence of a trigger event, etc. In addition, configurations can be set regarding the creation and transmission of data feeds for multiple objects and/or trigger events. For example, a user may wish to monitor trigger events for several different objects in a virtual universe. Each object may create an independent data feed. The user can set a configuration to receive the independent data feeds from each object or aggregate the independent feeds into one inclusive data feed.

Figure 5:
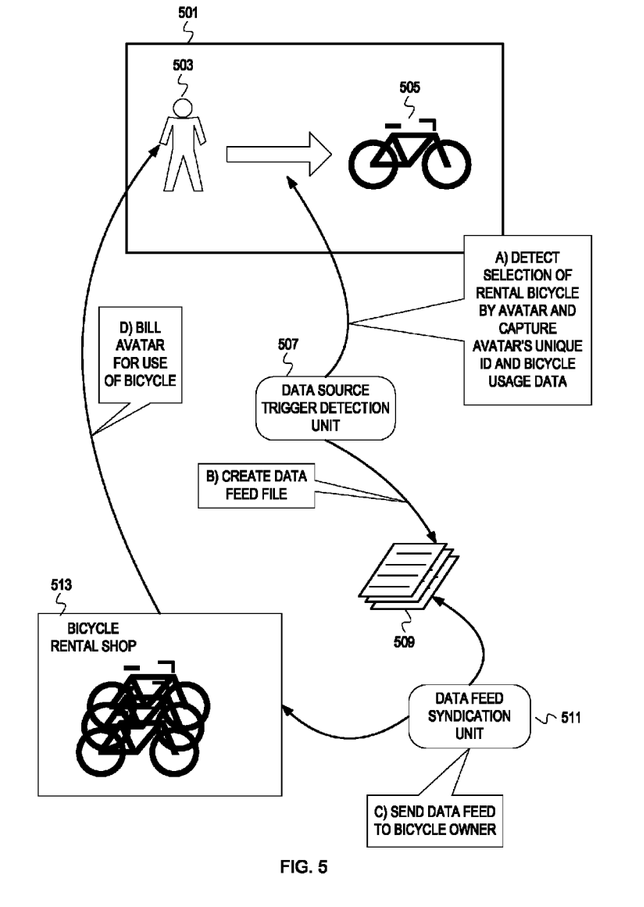
FIG. 5 depicts an example use of triggered data feeds in a virtual universe.

FIG. 5 depicts an example use of triggered data feeds in a virtual universe. An avatar 503 and a rental bicycle 505 exist within a virtual universe 501. The rental bicycle is an asset of a bicycle rental shop 513. At stage A, selection of the rental bicycle 505 by avatar 503 is detected by a data source trigger detection unit 507. The data source trigger detection unit 507 captures the unique identifier and bicycle usage data (e.g., model of bicycle chosen, how long the bicycle was used, distance traveled, a graphical map view of path traversed, etc.).

At stage B, a data feed file 509 is created by the data source trigger detection unit 507.

At stage C, a data feed syndication unit 511 sends the data feed to the bicycle rental shop 513. In one example, the data feed is sent to an owner of the bicycle rental shop 513 via a feed reader outside the VU. In another example, the data feed is sent to a feed reader inside the VU that monitors use of the assets of the bicycle rental shop 513. Notifications may be sent to an avatar belonging to the owner through communication services in the VU (e.g., instant message, email, etc.)

At stage D, the bicycle rental shop 513 uses the data to bill the avatar for use of the bicycle. In some embodiments, the billing may be an automated response to the trigger event in the data feed. In other embodiments, the billing may be manually initiated by the owner of the asset. The bicycle rental shop can conduct market research by setting up a data feed to accumulate data over a period of time to analyze popularity of certain models of bicycles, characteristics of avatars that rent bicycles, distances the bicycles are ridden, paths taken, etc.

Triggered data feeds can be used to reward users for certain behaviors in a VU. As an example, an avatar may be given a small amount of revenue for entering a park and being exposed to an advertisement. As another example, an avatar may be given a free song download for attending a concert and being one of the first 100 avatars to enter the venue.

In addition, triggered data feeds can be used to monitor the use of spaces by avatars and charge owners of the avatars for use. A space is defined as an area within specific boundaries in the virtual universe. For example, an owner of a convention center in a virtual universe can define a space that is part of the convention center. The owner can monitor avatar activity within the space such as time spent in the space, corporate booths visited in the space, number of avatars in the space, etc.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, permission to use an object as a data source may not be implemented in certain embodiments because all objects within some VU may be used as a data source by default. In addition, with reference to FIG. 4, a data feed may be conditioned upon multiple triggers. Additional operations may be performed to determine if additional trigger parameters have been met and/or a given time period has elapsed since the initial trigger.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible data storage medium of expression having computer usable program code embodied in the medium. The described embodiments may be provided as a computer program product, or software, that may include a machine-readable data storage medium having stored thereon instructions, which may be used to program a computer system (or other electronic device(s)) to perform a process according to embodiments, whether presently described or not, since every conceivable variation is not enumerated herein. A machine-readable data storage medium includes any mechanism for storing information in a form (e.g., software, processing application) readable by a machine (e.g., a computer). The machine-readable data storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
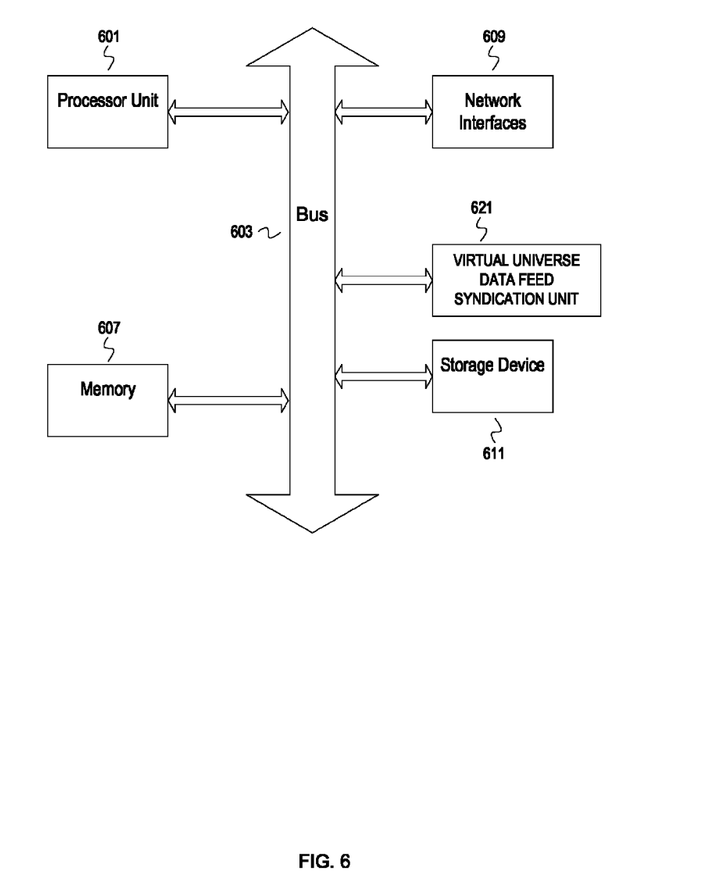
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 609 (e.g., an ATM interface, an Ethernet interface, a Frame Relay interface, SONET interface, wireless interface, etc.), and a storage device(s) 611 (e.g., optical storage, magnetic storage, etc.). A virtual universe data feed syndication unit 621 performs the functionalities described herein. For instance, the virtual universe data feed syndication unit 621 can aggregate objects as a data source, collect data from the data source into a data feed, and transmit the data feed to subscribers. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 611, and the network interface 609 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    a computer system receiving data collected by a virtual universe server collecting data from a plurality of virtual universe objects collectively designated as a data source in the virtual universe for a data feed, wherein the plurality of virtual universe objects comprise a building in the virtual universe, and wherein the plurality of virtual universe objects comprise a first virtual universe object that contains one or more additional virtual universe objects;
    the computer system aggregating the data collected by the virtual universe server into the data feed, wherein the data comprises data defining an interaction between the plurality of virtual universe objects and a plurality of avatars, wherein the interaction comprises at least one of a number of sales, a number of the plurality of avatars in the building, and demographics of the number of the plurality of avatars in the building; and
    the computer system distributing the data feed to one or more feed readers external to the virtual universe at a defined time interval, and distributing the data feed as a continuous stream of updates to a subset of the one or more feed readers.

2. The method of claim 1, wherein the data collected comprises graphical data about the plurality of virtual universe objects collected in accordance with one or more parameters that indicate at least one of a resolution level, an area limitation that limits a scene to be rendered, a number of avatars to depict, how to render any avatars in a scene corresponding to the plurality of virtual universe objects, and how to render the plurality of virtual universe objects.

3. The method of claim 1, wherein the computer system aggregating the data collected by the virtual universe server from the plurality of virtual universe objects comprises accumulating the data collected by the virtual universe server over a span of time and deriving statistical data from the data collected by the virtual universe server from the plurality of virtual universe objects.

4. The method of claim 1 further comprising the computer system generating graph data that represent one or more correlations between the statistical data and avatar activity over the span of time, wherein the data feed comprises the graph data.

5. The method of claim 1, further comprising:
    before the distributing the data feed, formatting the data collected by the virtual universe server;
    wherein the formatting comprises separating the data collected by the virtual universe server based on data types into different fields.

6. A computer program product for distributing a virtual universe data feed beyond a virtual universe, the computer program product comprising:
    one or more computer-readable tangible storage devices;
    program instructions, stored on at least one of the one or more storage devices, to receive data collected over a span of time from a plurality of virtual universe objects collectively designated as a data source for a data feed within a virtual universe, wherein the plurality of virtual universe objects comprise a building in the virtual universe, wherein the data comprises data defining an interaction between the plurality of virtual universe objects and a plurality of avatars, and wherein the interaction comprises at least one of a number of sales, a number of the plurality of avatars in the building, and demographics of the number of the plurality of avatars in the building;
    program instructions, stored on at least one of the one or more storage devices, to derive statistical data from the data collected over the span of time; and
    program instructions, stored on at least one of the one or more storage devices, to distribute the statistical data to one or more feed readers external to the virtual universe at a defined time interval, and distributing the statistical data as a continuous stream of updates to a subset of the one or more feed readers.

7. The computer program product of claim 6, further comprising:
    program instructions, stored on at least one of the one or more storage devices, to generate graph data of one or more correlations between the statistical data and avatar activity over the span of time; and
    program instructions, stored on at least one of the one or more storage devices, to distribute the graph data to the one or more feed readers.

8. The computer program product of claim 6, further comprising:
    program instructions, stored on at least one of the one or more storage devices, to format the data collected from the plurality of virtual universe objects prior to distributing the data feed;
    wherein the program instructions to format the data collected from the plurality of virtual universe objects prior to distributing the data feed separate the data collected from the plurality of virtual universe objects based on data types into different fields.

9. A computer system for distributing a virtual universe data feed beyond a virtual universe, the computer system comprising:
- a set of one or more processing units;
- a network interface;
- one or more computer-readable memories and one or more computer-readable tangible storage devices;
- program instructions, stored on at least one of the one or more storage devices for execution by at least one of the one or more processors via at least one of the one or more memories, to receive data collected from a plurality of virtual universe objects collectively designated as a data source in a virtual universe for a data feed, wherein the plurality of virtual universe objects comprise a building in the virtual universe;
- program instructions, stored on at least one of the one or more storage devices for execution by at least one of the one or more processors via at least one of the one or more memories, to aggregate the data collected from the plurality of virtual universe objects into the data feed, wherein the data collected from the plurality of virtual universe objects comprises data defining an interaction between the plurality of virtual universe objects and a plurality of avatars, and wherein the interaction comprises at least one of a number of sales, a number of the plurality of avatars in the building, and demographics of the number of the plurality of avatars in the building; and
- program instructions, stored on at least one of the one or more storage devices for execution by at least one of the one or more processors via at least one of the one or more memories, to distribute the data feed to one or more feed readers external to the virtual universe at a defined time interval, and distributing the data feed as a continuous stream of updates to a subset of the one or more feed readers;
- wherein the program instructions to aggregate the data collected from the plurality of virtual universe objects into the data feed accumulate the data collected from the plurality of virtual universe objects over a span of time and derive statistical data from the data accumulated from the plurality of virtual universe objects.

10. The computer system of claim 9, wherein the data collected from the plurality of virtual universe objects comprises graphical data about the plurality of virtual universe objects collected in accordance with one or more parameters that indicate at least one of a resolution level, an area limitation that limits a scene to be rendered, a number of avatars to depict, substitute objects to render for any avatars in a scene corresponding to the plurality of virtual universe objects, and rendering limitations on the plurality of virtual universe objects.

11. The computer system of claim 9, wherein said program instructions to aggregate the data collected from the plurality of virtual universe objects accumulate the data collected from the plurality of virtual universe objects over a span of time and derive statistical data from the data accumulated over the span of time.

12. The computer system of claim 9, further comprising:
- program instructions, stored on at least one of the one or more storage devices for execution by at least one of the one or more processors via at least one of the one or more memories, to format the data collected from the plurality of virtual universe objects, prior to distributing the data feed;
- wherein the program instructions to format the data collected from the plurality of virtual universe objects prior to distributing the data feed separate the data collected from the plurality of virtual universe objects based on data types into different fields.

* * * * *